July 7, 1942.

F. HUDSON 2,288,904

PIPE JOINT OR COUPLING

Filed Oct. 3, 1939

INVENTOR.
Franklin Hudson
BY
ATTORNEYS

Patented July 7, 1942

2,288,904

UNITED STATES PATENT OFFICE 2,288,904

PIPE JOINT OR COUPLING

Franklin Hudson, Roselle, N. J., assignor to Inner-Tite Clamp Corporation, Elizabeth, N. J., a corporation of New Jersey Application October 3, 1939, Serial No. 297,645

3 Claims. (Cl. 285—196)

My invention relates to a new and improved pipe joint or pipe coupling, and method of making the same.

One of the objects of the invention is to provide a primary sealing means which can be used in combination with conventional couplings of various well-known types for joining plain-end pipes or in combination with bell-and-spigot pipes. The conventional couplings which are used for joining plain-end pipes are known in the trade as "Dresser" and "Dayton," and the well-known joints for bell-and-spigot pipes are known in the trade under various names, such as "Doublex-Simplex," "Anthony or U. S." and the like.

Another object of the invention is to provide couplings which will be an improvement over the types of coupling illustrated in U. S. Patent No. 1,964,044 and No. 2,108,848.

Another object of the invention is to provide improved primary sealing means for pipe joints or pipe couplings.

Another object of the invention is to combine said improved primary sealing means with improved secondary sealing means, said secondary sealing means consisting of a tapered gasket member, whose narrow and highly-stressed face abuts the primary sealing device.

Another object is to provide a coupling or joint in which primary sealing means are given their final sealing shape by the insertion of a secondary sealing gasket or gaskets under suitable pressure, and in which the compressed secondary sealing means maintain the primary sealing means in final sealing shape.

Another object of the invention is to provide a combination in which the primary sealing means may be hot lead or other molten material which can be poured into place and which will solidify or harden in place.

Another object of the invention is to provide a device having primary sealing means which will prevent excessive loss of gas or liquid from the above mentioned commercial types of joints, if the secondary sealing gasket members are removed for temporary repairs or for replacement, so that the secondary sealing means can be removed and replaced without substantial leakage from the pipe line.

Another object of the invention is to provide a coupling or joint which will be especially useful in pipe lines which operate at high pressure and which are used for conveying gas, water, oil and the like.

Other objects of the invention will be set forth in the following description and drawing which illustrate preferred embodiments thereof.

Figure 2:
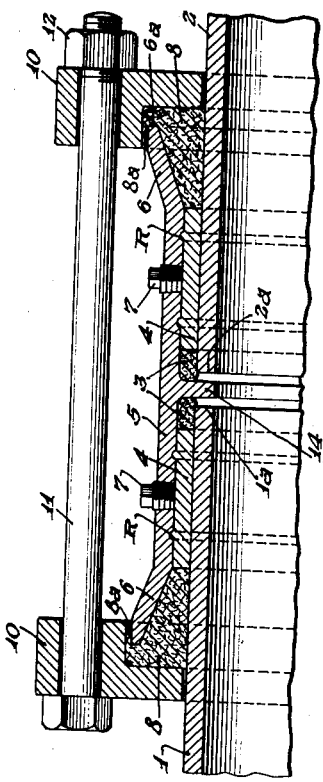
Fig. 2 is a sectional view on the line 2—2 of Fig. 1.
Figure 1:
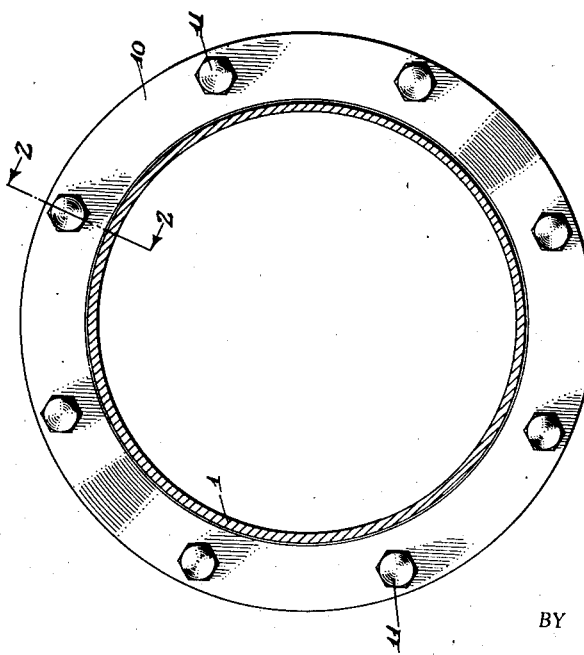
Fig. 1 is an end elevation of the improved coupling.

Referring to Fig. 2, this shows pipes 1 and 2 which are designated as plain-end pipes, as distinguished from bell-and-spigot pipes. In the bell-and-spigot pipes, one pipe partially enters the other pipe. However, the invention applies to any type of pipe or joint. In the embodiment of Figs. 1 and 2, the primary seal is provided by rings 3 which are made of jute or other compressible yarn or material and by rings 4, which are made of lead or other suitable metal or alloy or non-metallic material which can be shaped under high pressure. The pipes 1 and 2 are located within a coupling or joint-member 5 having outwardly tapered or flared ends 6. The coupling 5 is provided with holes which can be closed by plugs 7. Molten lead or molten lead alloy or other suitable molten metal or alloy can be poured through said openings, into the space between the outer walls of the pipes 1 and 2, and the inner wall of the coupling 5. When said molten metal solidifies, it forms metal rings 4. Prior to pouring in the molten lead, the members 3 and 8 are located in the positions shown in Fig. 2. During the pouring of the molten lead or the like, the members 8 are under no pressure, or under a pressure which is less than the final pressure to which they are subjected. The inner wall of the coupling 5 is provided with transverse annular grooves into which the molten lead enters, so as to form ribs R for retaining the rings 4 securely in position. The invention is not limited to the use of said ribs. After the rings 4 have solidified, the plugs 7 can be inserted into their openings. The secondary sealing means comprise the gaskets 8 which can be made of any suitable yieldable or resilient packing material, such as resilient vulcanized rubber or the like. I prefer to use resilient vulcanized rubber, or the synthetic rubbers which resist the action of oils, etc. Other resilient or yieldable materials can be used. As shown in Fig. 2, the gaskets 8 are tapered and their narrow ends abut the adjacent end-faces of the rings 4. The normal shape of said gaskets is frusto-conical, and said gaskets have cylindrical bores. Said gaskets 8 abut the inner walls of the tapered portions 6 of the wall of the coupling 5 and the outer walls of the pipes 1 and 2, when said gaskets are inserted. The gaskets 8 are compressed by the pressure which is exerted by collars 10. Said gaskets 8 can retain their resilience after they have been thus compressed. If removed after having been newly inserted and compressed, they spring back substantially to normal shape. The thick ends of said gaskets 8 are confined in recesses of collars 10. Said collars are slidably mounted on the respective pipes 1 and 2, and these collars 10 can be forced towards each other by means of bolts 11 and nuts 12. Each bolt may exert a force of one ton. The gaskets 8 may have very thin overlapping portions 8a when they are finally compressed, or their wide ends may be wholly confined between collars 10 and the ends of portions 6 of couplings 5. That is, the collars 10 may fit over the ends of the joint-member 5 with very slight clearance, just enough to permit the movement of said collars, so that the gaskets 8 are substantially enclosed and maintained under high pressure. The outer wall of each member 5 has an intermediate wall-portion which is parallel to the common longitudinal axis of pipes 1 and 2. Said intermediate outer wall-portion has extensions which are inclined to said axis, and said extensions terminate in end-portions which are parallel to said axis.

When the parts of Fig. 2 are assembled under high pressure, a very effective and tight joint is secured. The rings 4 are made of lead or equivalent material which is plastic under high pressure. The rings 4 are anchored against longitudinal movement by the ribs R. The molten lead contracts slightly when it solidifies. When pressure is exerted by gaskets 8 against the adjacent ends of rings 4, said rings are compressed and their shape is changed so as to produce the final sealing fit. This change in shape may take some time, from 24 hours to a week or more, because the lead creeps slowly. However, the lead rings are held in deformed and tight-sealing shape, before the gaskets require renewal, as the life of a gasket is normally more than one year. Rings made of lead or the like tend to be shifted or to change in shape by vibration and possibly by temperature changes, thus injuriously affecting the sealing fit. The high pressure of the confined gaskets 8 maintains the rings 4 in final sealing shape. Hence if the gaskets 8 are removed and replaced under normal working conditions, the rings 4 will maintain their final shape during the interim. Therefore, there is little or no leakage from the pipe line while new gaskets are being inserted. The gaskets are wholly confined by the recesses in collars 10 prior to and during the compression of the gaskets. The tapered shape of the gaskets concentrates the pressure on the relatively thin metal rings 4, and it also provides an effective secondary seal between the rings 4 and the collars 10.

The coupling 5 is provided at its internal wall with a continuous annular rib or flange 14. When the parts are assembled, the end faces 1a and 2a of the pipes 1 and 2 are spaced from this rib or flange 14, so as to permit the pipes 1 and 2 to expand relative to the coupling, when thermal changes occur. However, the packings 3 are forced under great pressure against the adjacent faces of said rib or flange 14, and also against the inner surface of the joint-member 5 and the outer surfaces of the pipes.

Figure 3:
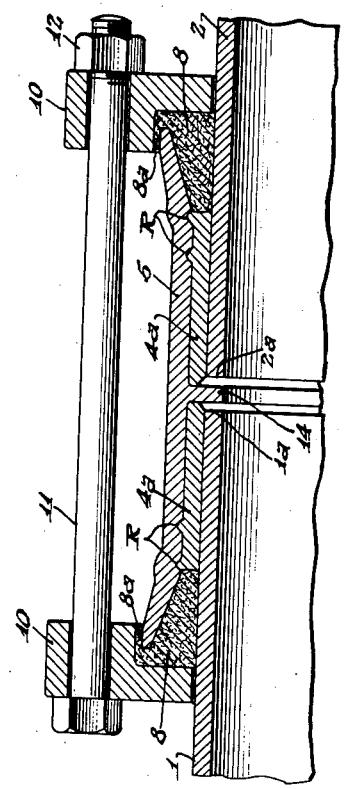
Fig. 3 is a view similar to Fig. 2, showing a modification.
Figure 4:
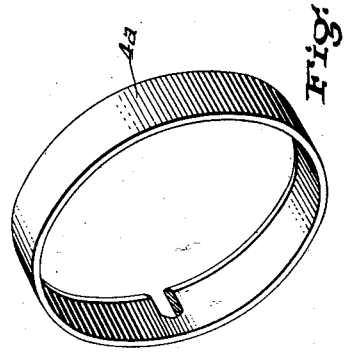
Fig. 4 is a perspective view of one of the lead rings which are used as primary sealing means in the embodiment of Fig. 3.

The embodiment shown in Fig. 3 is substantially the same as that shown in Fig. 2, save that the embodiment in Fig. 3 uses preformed lead rings 4a and it eliminates the yarn or jute packing 3. If desired, said yarn or jute packing 3 can be utilized in Fig. 3. The preformed lead rings 4a are of general annular shape having continuous cylindrical inner and outer rims. In Fig. 4, a part of the ring 4a is shown cut away in order to illustrate the device more clearly but said ring is of continuous annular shape. The inner ends of said rings 4a are blunt and cut-away, as shown in Fig. 3. These rings 4a are inserted until their inner end-walls abut the flange or partition 14. They then have a loose and non-sealing fit. The rings 4a are then subjected either to hammering or to pressure in an axial direction, until their outer ends are expanded so as to form ribs R, which enter corresponding continuous annular recesses of the coupling 5. The blunt cut-away shape of the inner ends of the rings 4a prevents the material of rings 4a from spreading downwardly too much at said inner ends, in the spaces between rib 14 and the inner ends of the pipes. After the lead rings 4a have thus been preliminarily hammered or compressed, the gaskets 8 are inserted and subjected to longitudinal pressure by the collars 10, in the manner previously described. The pressure of the gaskets may further deform the rings 4a. In any event, the gaskets maintain rings 4a in final sealing shape. That is, the caulking of the rings shapes them into the desired sealing shape, and the high pressure of the gaskets maintains them in said tight-sealing shape, so that the gaskets 8 can be removed and replaced, without shutting off the line. Hence tight-sealing shape is defined as a shape which makes it possible to replace the gaskets, without shutting off the line. The lead rings then make tight-sealing contact with the pipe and coupling.

While the invention is not limited to any specific dimensions or proportions, the following is a working example:

The external diameter of pipes 1 and 2 is 6⅝ inches, and their internal diameter is about 6 inches. The thickness of metal rings 4 or 4a is ¼ of an inch. The length of each said ring is 1½ to 2 inches. Each resilient vulcanized rubber gasket prior to its assembly with the other parts has an axial length of one inch. The thickness of its wall at its narrow end is ¼ of an inch, and the thickness of its wall at its wide end is ⅝ of an inch. After installation, the length of the gasket in the direction of its longitudinal axis is about 0.97 inch.

Although the gasket is shortened only 0.03 inch by its compression, said compression in the frusto-conical space produces very high pressure.

The gaskets 8 can be made of pure resilient vulcanized rubber or they may be made of a combination of fabric and resilient vulcanized rubber.

In the embodiments disclosed herein, the narrow ends of the gaskets 8 make direct contact with the outer edge-walls of the rings 4 or 4a. It would not be departing from the invention if intermediate yielding means were located between the narrow ends of the gaskets 8 and the outer edge-walls of the rigid rings 4 and 4a, as long as the pressure of said gaskets 8 is exerted upon the rings 4 or 4a.

I have shown preferred embodiments of my invention, but it is clear that numerous changes and omissions can be made without departing from its spirit.

The compression of the lead rings 4a, which produces ribs R, produces a substantially or wholly tight sealing fit. For convenience, the members 4 and 4a may be designated as rigid members although they yield under sufficiently high pressure. However, said members 4 and 4a are substantially non-elastic, whereas the gaskets are elastic.

While the dimensions of the gaskets are altered only slightly by the compression above stated, these enclosed gaskets behave substantially like incompressible liquids, before they have been compressed to their final reduced size.

As shown in Fig. 1, this embodiment has eight bolts 11. As previously stated, each bolt exerts a force of about one ton, when the nuts 12 are finally tightened. The enclosed gaskets are therefore subjected to a force of about eight tons and the outer ends of the rings 4 and 4a are subjected to this very high force. The rings are therefore deformed into tight sealing shape under this very high force, or they are held in said tight-sealing shape if they have been caulked into said tight-sealing shape.

Theoretically the gaskets 8 are not necessary but they prevent the rings 4 or 4a from spreading so as to lose their tight sealing fit when the joint is subjected to shocks or to temperature changes.

It will be noted that the rigid rings 4 and 4a are deformed by longitudinal pressure in situ, so that the outer ends of said rings are deformed so as to produce tight sealing contact independently of the gaskets 8.

Since the rings are subjected to a total pressure of 16,000 lbs., the pressure which is exerted on the lead rings exceeds 500 lbs. per square inch. Lead creeps and flows slowly, when it is subjected to a pressure of 500 lbs. per square inch. In the embodiment of Fig. 2, the applied pressure of gaskets 8 will slowly deform the lead rings 4 until said rings have a tight-sealing shape, which will be maintained by the continued pressure of gaskets 8. In the embodiment of Fig. 3, the applied pressure, being in excess of the "creeping" pressure, will prevent the lead rings 4a from creeping out of their tight-sealing shape, when said rings 4a are subjected to vibration, pipe settlement and changes in temperature.

I claim:

1. In combination, a joint-member having an inner wall which comprises an intermediate wall-portion and end wall-portions which are outwardly flared relative to said intermediate wall-portion, pipes which have end-portions which are located within said intermediate wall-portion and which are spaced laterally from said intermediate wall-portion and from said end wall-portions, rigid primary sealing members located between and contacting with said intermediate wall-portion and with the corresponding parts of the outer walls of said end-portions of the pipes, each said primary sealing member having a tight-sealing shape, the inner ends of said primary sealing members being held spaced longitudinally from each other, the material of said primary sealing members creeping when said material is subjected to a pressure in excess of creeping pressure, a sealing gasket associated with each primary sealing member, each gasket having its inner end abutting the outer end of the respective sealing member, each gasket being located between and fitting between the inner wall of the respective end wall-portion and the respective outer wall of the end-portion of the respective pipe, pressure means exerting pressure on the outer ends of said gaskets and maintaining said gaskets and said primary sealing members under an applied pressure in excess of creeping pressure, means holding said primary sealing members and said gaskets substantially enclosed under said applied pressure, so that said primary sealing members are maintained under said excess pressure.

2. In combination, a joint-member which has an inner wall, said inner wall having an intermediate wall-portion and also having end wall-portions which are outwardly flared relative to said intermediate wall-portion, said intermediate wall-portion having an inwardly projecting annular abutment rib, pipes which have end-portions which are located within said intermediate wall-portion, said end-portions of said pipes being spaced laterally from said intermediate wall-portion and also from said end wall-portions, said annular rib being located between the end-faces of said end-portions of the pipes, rigid primary sealing members located at opposite sides of said rib and contacting with said intermediate wall-portion and with the corresponding parts of the outer walls of said end-portions of the pipes, each said primary sealing member having a tight-sealing shape, the material of said primary sealing members creeping when said material is subjected to a pressure in excess of creeping pressure, sealing gaskets, each sealing gasket having an inner end which abuts an outer end of one of said primary sealing members, each gasket being located substantially wholly and fitting between one of said end wall-portions and the corresponding part of the outer wall of the end-portion of the respetcive pipe, pressure means exerting pressure on the outer ends of said gaskets, said pressure means and said rib confining the primary sealing members to prevent creeping under pressure in excess of said creeping pressure, the inner ends of said primary sealing members being held spaced by said rib from the end-walls of the end-portions of the pipes which said sealing members are subject to said excess pressure, said primary sealing members being free from laterally opposed external ribs and permitting relative movements between said pipes under changes in temperature and under vibration.

3. A device according to claim 2, in which the inner walls of said primary sealing members are substantially cylindrical.

FRANKLIN HUDSON.